US008903744B2

(12) United States Patent
Halsema et al.

(10) Patent No.: US 8,903,744 B2
(45) Date of Patent: Dec. 2, 2014

(54) SYSTEM AND METHOD FOR CONTROLLING ACCESS TO PERSONAL IDENTIFICATION INFORMATION CONTAINED IN DOCUMENTS

(75) Inventors: Aillil I. Halsema, Los Angeles, CA (US); May G. Onaga, Cypress, CA (US); Jie Lin, Webster, NY (US); Daniel W. Manchala, Torrance, CA (US)

(73) Assignee: Xerox Corporation, Norwalk, CT (US)

( * ) Notice: Subject to any disclaimer, the term of this patent is extended or adjusted under 35 U.S.C. 154(b) by 1921 days.

(21) Appl. No.: 11/282,780

(22) Filed: Nov. 18, 2005

(65) Prior Publication Data

US 2007/0118479 A1    May 24, 2007

(51) Int. Cl.
*G06F 21/00* (2013.01)
*G06F 21/62* (2013.01)
*G06Q 20/38* (2012.01)

(52) U.S. Cl.
CPC .......... *G06F 21/6245* (2013.01); *G06Q 20/382* (2013.01)
USPC ................. 705/64; 713/183; 705/51; 705/65; 705/67

(58) Field of Classification Search
None
See application file for complete search history.

(56) References Cited

U.S. PATENT DOCUMENTS

| | | | |
|---|---|---|---|
| 4,728,984 A | | 3/1988 | Daniele |
| 5,889,941 A | * | 3/1999 | Tushie et al. ..................... 726/26 |
| 5,982,956 A | | 11/1999 | Lahmi |
| 6,038,666 A | * | 3/2000 | Hsu et al. ..................... 713/186 |
| 6,128,735 A | * | 10/2000 | Goldstein et al. ............. 713/166 |
| 6,175,714 B1 | | 1/2001 | Crean |
| 6,212,504 B1 | * | 4/2001 | Hayosh ........................... 705/64 |
| 6,425,081 B1 | * | 7/2002 | Iwamura ....................... 713/176 |
| 6,523,116 B1 | * | 2/2003 | Berman ........................ 713/182 |
| 2003/0177366 A1 | * | 9/2003 | de Jong ......................... 713/184 |
| 2004/0117627 A1 | * | 6/2004 | Brewington .................. 713/176 |
| 2005/0038756 A1 | | 2/2005 | Nagel |

OTHER PUBLICATIONS

R.L. Rivest, A. Shamir, and L. Adelman in their paper "A Method for Obtaining Digital Signatures and Public-Key Cryptosystems," Communications of the ACM, vol. 21 (2) 1978.

* cited by examiner

*Primary Examiner* — Tsan-Yu J Huang
(74) *Attorney, Agent, or Firm* — Philip E. Blair; Fleit Gibbons Gutman Bongini & Bianco P.L.

(57) ABSTRACT

A system and method for creating a document containing secured personal identification information includes a database containing personal identification information; a classifier module for collecting and classifying the personal identification information; a memory module for storing the classified personal identification information; a password generator for associating a password combination with the classified personal identification information; a controller module for receiving and sending the classified personal identification information and the password combination to a processor; an encryptor in operative communication with the processor, for encrypting the classified personal identification information using the password combination; an encoder for converting the encrypted personal identification information into machine readable code; and a data recording system for creating a document containing secured personal identification information.

15 Claims, 5 Drawing Sheets

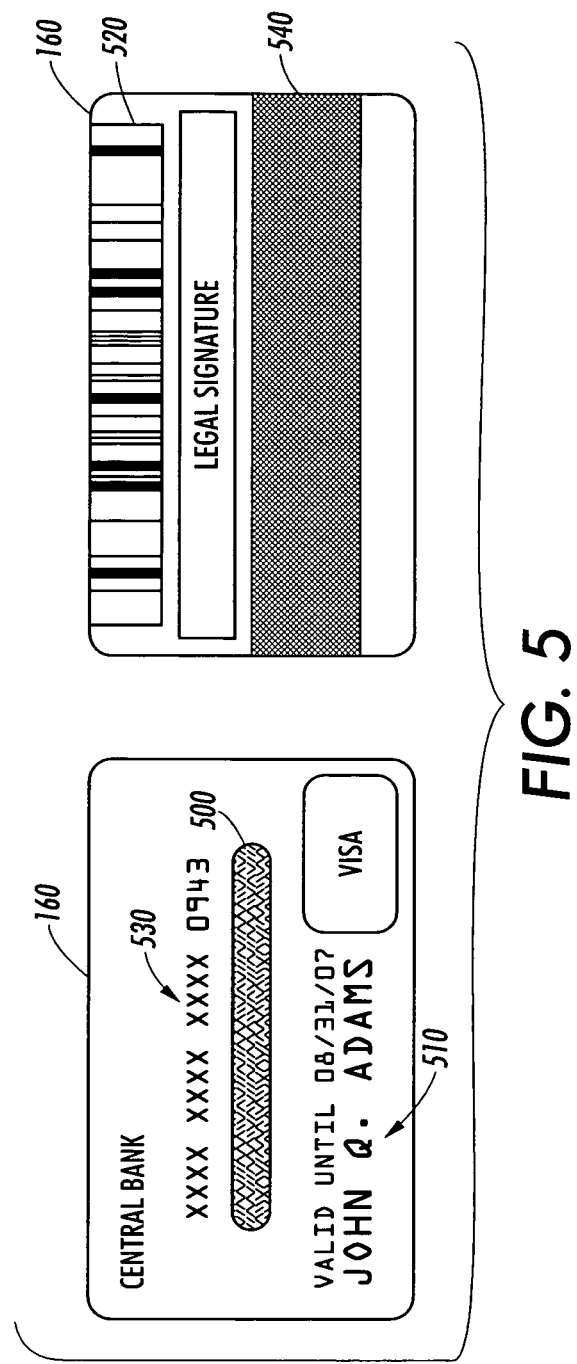

SYSTEM AND METHOD FOR CONTROLLING ACCESS TO PERSONAL IDENTIFICATION INFORMATION CONTAINED IN DOCUMENTS

FIELD OF THE INVENTION

The embodiments disclosed herein relate to documents containing secured personal identification information, and more particularly to systems and methods for controlling access to the secured personal identification information contained in documents.

BACKGROUND OF THE INVENTION

Individuals are often comfortable dealing with documents in hardcopy format. In general, hardcopy documents are easier to read, handle, and store than documents kept in the digital domain. However, privacy of personal identification information is a concern because the information can be easily read and transmitted from person to person. As such, there is a risk of documents containing personal identification information being seen by persons without authorization.

Methods exist to limit the amount of personal identification information that is visible on a hardcopy document. The emergence of electronic document processing systems has enhanced significantly the functional utility of plain paper and other types of hardcopy documents when the visible (or human readable) information they normally convey is supplemented by writing appropriate secured (or machine readable) digital data on the documents. Various methods of embedding machine readable code into documents in order to control the amount of information visible on a document have been tried, and are described in U.S. Pat. No. 4,728,984 entitled "Data Handling and Archiving System," U.S. Pat. No. 5,982,956 entitled "Secure Method for Duplicating Sensitive Documents," and U.S. Pat. No. 6,175,714 entitled "Document Control System and Method for Digital Copiers," all of which are incorporated by reference in their entireties for the teachings therein.

Prior attempts to limit access to personal identification information offered access that is all or nothing. For example, a document contains no visible personal identification information, contains a plethora of visible personal identification information, or contains machine readable personal identification information to which access to is given to any individual with capabilities of encoding the personal identification information. Thus, there is a need in the art for documents that limit the amount of visible personal identification information and allow only those individuals who should have access to the information to view it. By replacing the human readable personal identification information with machine readable code that has been encrypted using public key cryptography, access to the personal identification information may be limited.

SUMMARY OF THE INVENTION

A system and method for controlling access to secured personal identification information contained in a document is disclosed.

According to aspects illustrated herein, there is provided a system for creating a document containing secured personal identification information including a database containing personal identification information, a classifier module for collecting and classifying the personal identification information, a memory module for storing the classified personal identification information, a password generator for associating a password combination with the classified personal identification information, a controller module for receiving and sending the classified personal identification information and the password combination to a processor, an encryptor in operative communication with the processor, for encrypting the classified personal identification information using the password combination, an encoder for converting the encrypted personal identification information into machine readable code, and a data recording system for creating a document containing secured personal identification information.

According to aspects illustrated herein, there is provided a system for accessing secured personal identification information contained in a document including a document reader module for receiving and translating a document containing secured personal identification information into an electronic image, a decoder in operative communication with the document reader module, wherein the decoder extracts and decodes the secured personal identification information from the document, a memory module for storing the decoded personal identification information, a controller module for receiving and sending the decoded personal identification information to a processor, a decryptor in operative communication with the processor, for decrypting the personal identification information based on a password combination, and an image producing system for displaying the decrypted and decoded personal identification information.

According to aspects illustrated herein, there is provided a method for creating a document containing secured personal identification information including accessing a database that contains personal identification information for at least one individual, choosing which personal identification information should be secured, encrypting the personal identification information using a public key associated with a merchant, encrypting the personal identification information using a private key associated with an individual to whom the personal identification information belongs, encoding the encrypted personal identification information into machine readable code, and incorporating the encoded personal identification information within a document to create a document containing secured personal identification information.

According to aspects illustrated herein, there is provided a method for accessing secured personal identification information contained in a document including detecting secured personal identification information in a document, decoding the secured personal identification information in the document, entering a private key associated with a merchant wishing to gain access to the secured personal identification information in the document, entering a private key associated with an individual to whom the document belongs, determining which of the secured personal identification information contained in the document should be decrypted, and accessing the decrypted personal identification information such that the merchant is able to view the personal identification information.

BRIEF DESCRIPTION OF THE DRAWINGS

The presently disclosed embodiments will be further explained with reference to the attached drawings, wherein like structures are referred to by like numerals throughout the several views. The drawings are not necessarily to scale, the emphasis having instead been generally placed upon illustrating the principles of the presently disclosed embodiments.

FIG. 5 is an exemplary illustration of a document containing secure personal identification information created using the systems and methods disclosed herein.

DETAILED DESCRIPTION

Figure 1:
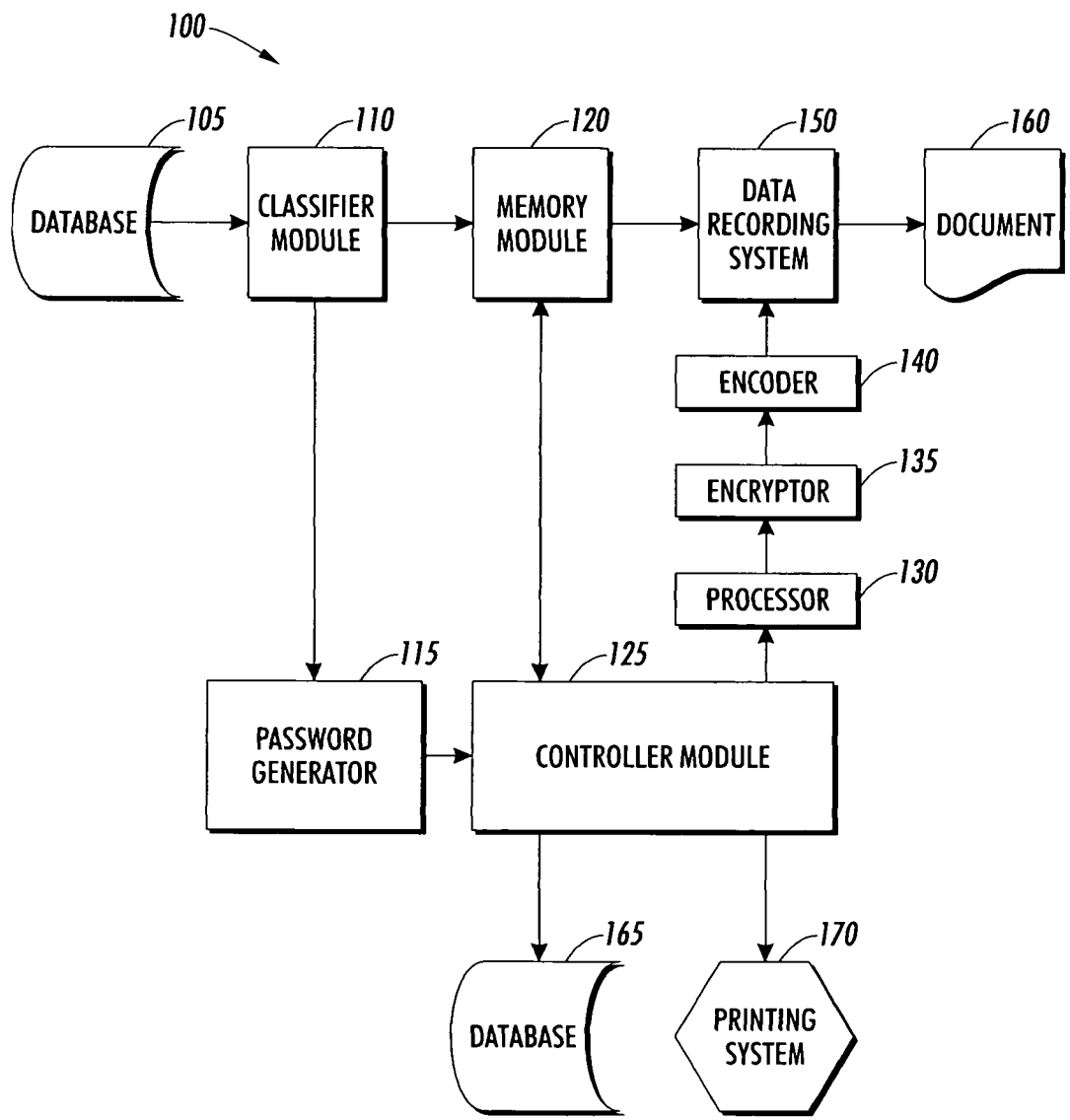
FIG. 1 is a schematic diagram showing the main components of a system for creating a document containing secured personal identification information.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

A system and method for controlling access to secured personal identification information within a document is disclosed. The personal identification information within the document has been encrypted using public key cryptography and encoded using machine readable code. Public key cryptography is a form of cryptography which generally allows users to communicate securely without having prior access to a shared secret key, by using a pair of cryptographic keys, designated as public key and private key, which are related mathematically. Even if a document is widely accessed to individuals capable of decoding the machine readable code, the personal identification information can not be decrypted unless a correct pair of cryptographic keys is known.

In the method for creating a document containing secured personal identification information a database that contains personal identification information for at least one individual is accessed; personal identification information is chosen to be rendered secure; the personal identification information is encrypted using a public key associated with a merchant; the personal identification information is encrypted using a private key associated with the individual to whom the personal identification information belongs; the encrypted personal identification information is encoded into machine readable code; and the encoded personal identification information is incorporated in a document to create a document containing secured personal identification information.

"Document" as used herein refers to any printed or written item containing visually perceptible data, as well as to any data file which may be used to produce such a printed or written item. While a document is typically at least one sheet of paper, the definition of document includes, but is not limited to, pages, sheets, labels, boxes, packages, tags, boards, cards, signs and any other item which contains or includes a "writing surface" as defined herein below. A document may be a hardcopy, an electronic document file, one or a plurality of electronic images, electronic data from a printing operation, a file attached to an electronic communication or data from other forms of electronic communication.

"Writing surface" as used herein includes, but is not limited to, paper, cardboard, acetate, plastic, fabric, metal, wood and adhesive backed materials. Writing surfaces may be applied, for example, as pre-cut sheets or rolls.

"Secured personal identification information" as used herein refers to personal identification information that has been encrypted and encoded into machine readable code. Personal identification information may be decrypted based on public key cryptography algorithms. When an owner presents a document having secured personal identification information, the personal identification information can only be decrypted if a pair of cryptographic keys is used.

"Customer" and "owner," as used herein refer to the individual to whom the personal identification information belongs. For example, John Smith is the owner of the personal identification information including a social security number in the form 000-00-0000.

"Merchant" and "verifier," as used herein refer to the person who is trying to access the owner's personal identification information. For example, the merchant may be a bank teller or similar employee.

With reference to FIG. 1, a system 100 for creating a document 160 having secured personal identification information includes a number of components, which will be described in detail. A database 105 contains personal identification information. The database 105 may contain personal identification information for a single individual or for a number of individuals. For example, the database 105 may contain personal identification information for 5 individuals, 25 individuals, 50 individuals, or hundreds of individuals. In an embodiment, the personal identification information belonging to each individual may exist in a folder on the database 105 that is named using the individuals' name. The database 105 maintains each individual with their own unique personal identification information. The personal identification information stored on the database 105 may include, but is not limited to, text, data, and images. In an embodiment, the personal identification information is text. The text may include personal identification information including, but not limited to, a drivers license number, a social security number, a bank account number, a home address, and a credit card account number. In an embodiment, the personal identification information is an image. The image may be, for example, a picture of the individual to whom the personal identification information belongs. Those skilled in the art will recognize that any personal identification information that can be encrypted and encoded can be used.

A classifier module 110 collects the desired personal identification information associated with a particular individual from the database 105 and classifies each entry, providing selection criteria for passwords that are to be used for encryption of the personal identification information. For example, the bank account number for a particular individual will be classified as "Bank" and will be associated with a password (public key) that represents the password of a bank teller and a bank manager. For example, the drivers' license number for a particular individual will be classified as "Law Enforcement" and will be associated with a password (public key) that represents the password of a police officer, correction officer, and a sheriff. Those skilled in the art will recognize that the personal identification information can be classified using any means and still be within the scope and spirit of the presently disclosed embodiments.

A memory module 120 stores the classified personal identification information. A private/public password generator 115 in operable communication with the classifier module 110 determines a password combination for the classified personal identification information. The password combination includes a public key for a merchant and a private key for the owner of the personal identification information. A controller module 125 receives the classified personal identification information from the memory module 120 and the password combination from the password generator 115 and sends the information to a processor 130. The processor 130 provides the information to an encryptor 135 for encryption according to automated public key cryptography algorithms.

The controller module 125 controls an encoder 140, and a data recording system 150, which converts the encrypted personal identification information into appropriate machine readable code to be placed in, for example, a document image in order to produce the document 160 having secured personal identification information. The document 160 may include, but is not limited to, an identification card or other from of ID issued by a government or company, a credit card, a debit card, a driver's license, a bank check, and a passport. In an embodiment, the machine readable code is configured as glyphs. The coding and decoding of glyphs is known in the art and is described in commonly assigned U.S. Pat. No. 5,444,779, the entirety of which is hereby incorporated by reference. Those skilled in the art will realize that other types of machine readable codes may be embedded in the document including, but not limited to, magnetic stripes, microdots, multi-dimensional bar codes and similar machine readable codes without departing from the spirit and scope of the present invention. The document 160 may be a hardcopy, an electronic document file, one or a plurality of electronic images, electronic data from a printing operation, a file attached to an electronic communication or data from other forms of electronic communication. The data recording system 150 can reproduce the document 160.

Additionally, the controller module 125 may interface with a database 165 to record a variety of data relative to production of the document 160. In an embodiment, the data recorded is an audit log. Examples of audit logs include, but are not limited to, the date and time the personal identification information was classified and encrypted, the actual personal identification information encrypted, the classification of the personal identification information, and the password combination used for encryption of the personal identification information. Further, the controller module 125 may interface with a printing system 170 to produce a record of the data recorded on the database 165. In an embodiment, the printing system 170 produces a record of the password combination used for encryption. In an embodiment, the printing system 170 produces a record of the private key used for encryption.

Figure 2:
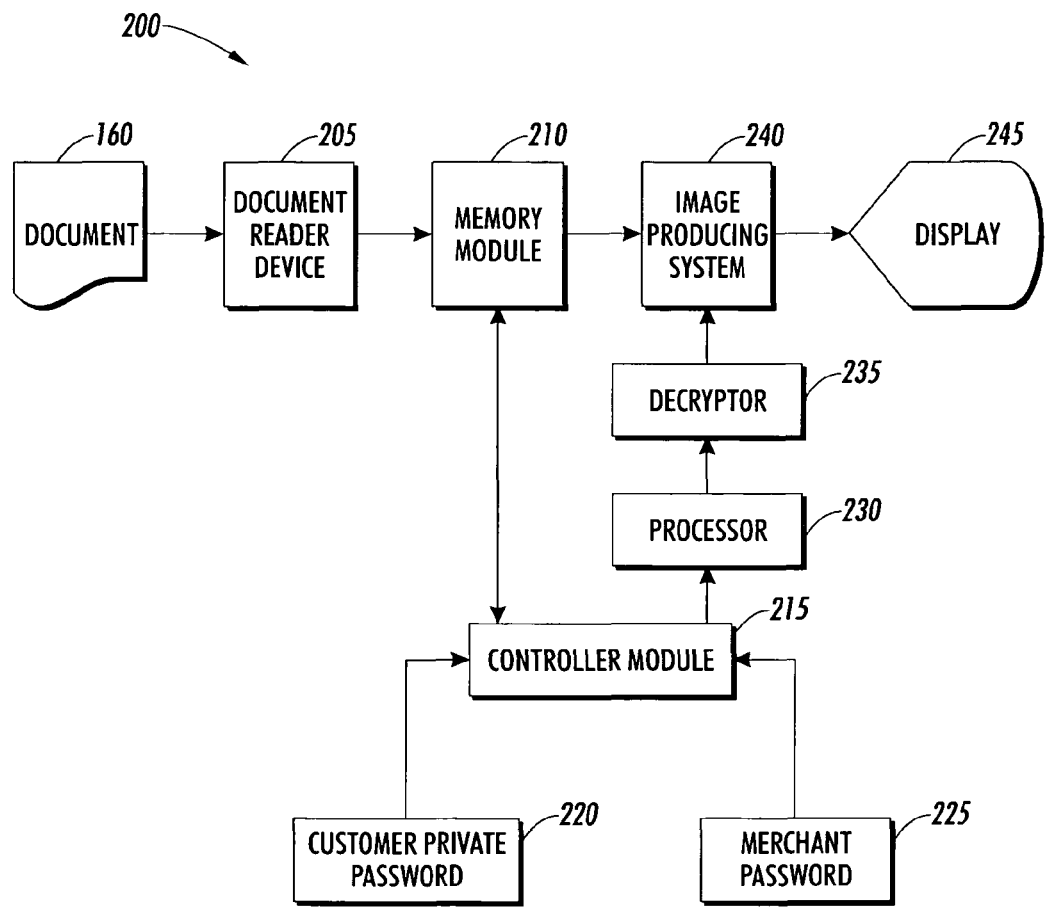
FIG. 2 is a schematic diagram showing the main components of a system for accessing secured personal identification information on a document.

FIG. 2 illustrates a system 200 for accessing personal identification information within a document 160 having secured personal identification information. System 200 includes a document reader device 205, which receives and translates the document 160 into a bitmap image. The document reader device 205 may include one or more of the following known devices: a copier, a xerographic system, an electrostatographic machine, a digital image scanner (e.g., a flat bed scanner or a facsimile device), a disk reader having a digital representation of a document on removable media (CD, floppy disk, rigid disk, tape, or other storage medium) therein, or a hard disk or other digital storage media having one or more document images recorded thereon. Those skilled in the art will recognize that the system 200 would work with any device suitable for printing or storing a digitized representation of a document.

The document 160 may also be generated electronically and saved in bitmap format. It will be understood by one skilled in the art that bitmap document images may be readily converted into or derived from other electronic image formats, including, but not limited to, JPEG, PDF and TIFF and similar images.

The bitmap image of the document 160 is read using a machine readable decoder that is either part of the document reader device 205 or a separate device. The decoder reads the machine readable code into a memory module 210 from the bitmap image. In an embodiment, a decryptor 235 acts as a decoder. A controller module 215 receives the encrypted personal identification information from the memory module 210, a private password 220 associated with the customer (entered by the presenter of the secure document 160), and a password 225 associated with the merchant (entered by the merchant wishing to gain access to the personal identification information). The controller module 215 may comprise any authenticator or user identity system known to those skilled in the security arts. The controller module 215 generally includes a keyboard or another input instrument for entering user instructions. A processor 230 and the decryptor 235 used by the controller module 215 produces the decrypted personal identification information using an automatic public key decryption system for display by an image producing system 240 and display 245. Both of the passwords 220 and 225 are required for decryption to proceed successfully. The passwords 220 and 225 and the automatic public key decryption system are applied to all encrypted personal identification information in the memory module 210, but only personal identification information that decrypts successfully is displayed by the image producing system 240 and the display 245. In a mechanism that is reverse to what was used for encryption, the merchant uses the private key (of the corresponding public key that was used to encrypt personal identification information onto the secure document) to decrypt the personal identification information after performing another decryption using the customers' private key (for example, a personal identification number (PIN)).

Figure 3:
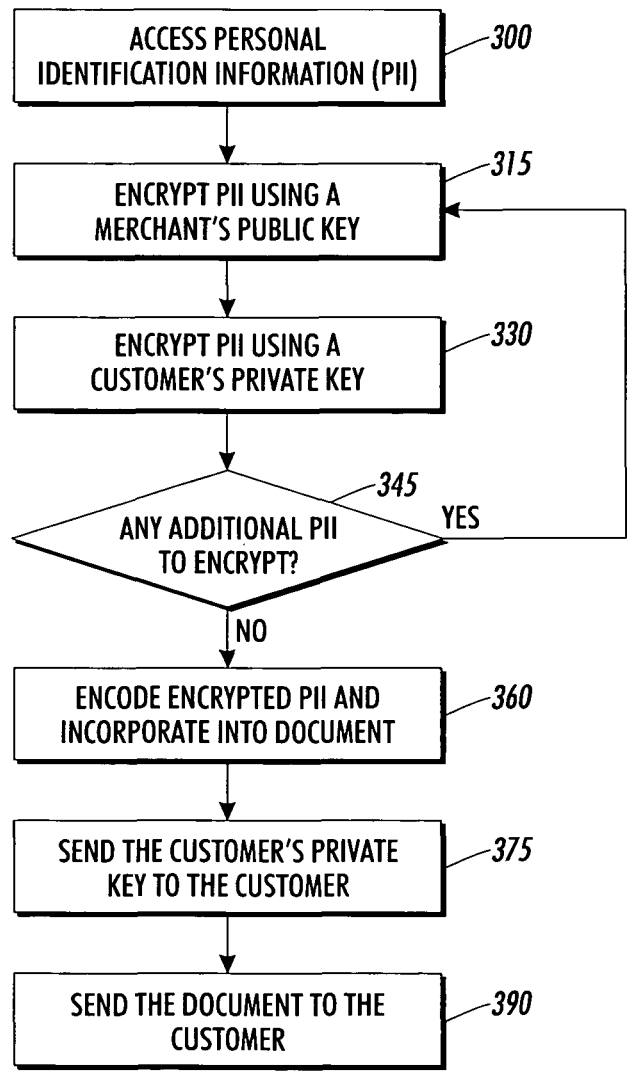
FIG. 3 is a flow diagram illustrating a method of creating a document containing secure personal identification information.

FIG. 3 is a flow diagram illustrating the steps of a method for creating a document 160 having secured personal identification information. In step 300, a user with the authority to create a document 160 accesses the database 105. In step 315, the desired personal identification information (PII) associated with an individual is encrypted using a merchant's public key. In step 330, the now encrypted personal identification information is again encrypted using a customer's private key. The encryption in both steps 315 and 330 is performed using a public-key cryptosystem such as that described by R. L. Rivest, A. Shamir, and L. Adelman in their paper "A Method for Obtaining Digital Signatures and Public-Key Cryptosystems," Communications of the ACM, Vol. 21 (2) 1978, which is incorporated by reference in its entirety for the teachings therein. In public key cryptography (asymmetric cryptography), each person is the owner of a mathematically related pair of keys: a public key, intended to be available to anyone who wants it; and a private key, which is kept secret and only known by the owner.

Once the desired PII has been encrypted, the method checks to see whether there is any additional PII to be encrypted, as shown in step 345. If there is additional PII to be encrypted, the method returns to step 315. If there is no additional PII to be encrypted, the method proceeds to step 360. Steps 315 and 330 are repeated for each merchant that may need to access the personal identification information for a customer. Steps 315 and 330 may also be repeated for different merchants trying to access different desired personal identification information. In a real world that has thousands of merchants; a certain root key for a large sub-set of the merchants can be used for encryption. Following encryption, the now doubly-encrypted personal identification information is incorporated into the document 160 using some form of machine-readable code, as shown in step 360. Optionally, the customer's private key may be sent to the customer electronically or by mail, the first time the document 160 is created or whenever the customer changes or loses the key, as shown in step 375. The private key could be in the form of a PIN or further encrypted with a PIN. Also, the document 160 may be sent to the appropriate customer, as shown in step 390. In an embodiment, the personal identification information is encrypted using a merchant's public key after being encrypted by a customer's symmetric private key. In an embodiment, different levels of personal identification information are encrypted using different symmetric private keys, each of which in turn are encrypted using a merchant's public key depending upon what level of personal identification information is required by the merchant. In an embodiment, the necessary public keys are picked from a tree hierarchy of PKI certificates. Within a much widely spread group of establishments, established trusts between tree hierarchies may be used to select trustworthy public keys.

Figure 4:
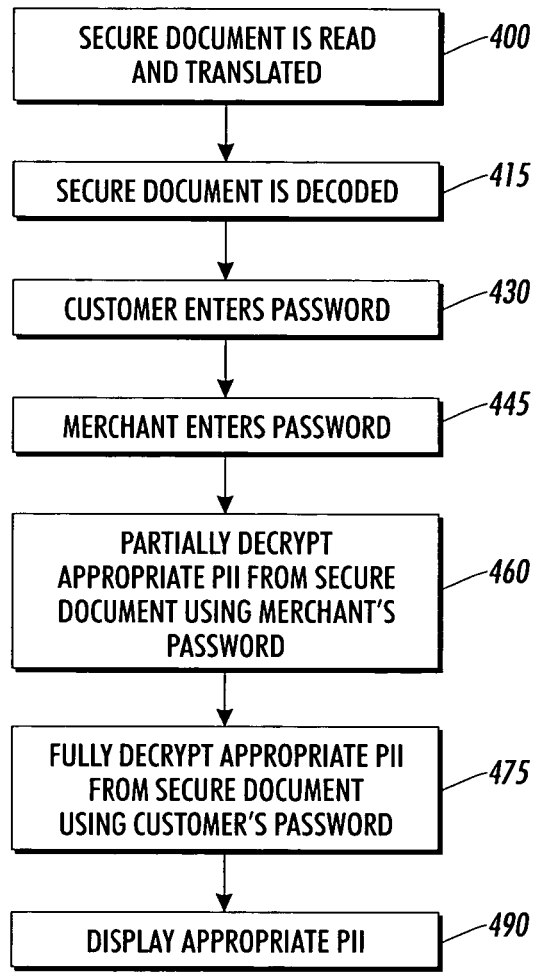
FIG. 4 is a flow diagram illustrating a method of accessing secured personal identification information on a document.

FIG. 4 is a flowchart illustrating the steps of a method for accessing the personal identification information (PII) within the document 160 having secured personal identification information. Referring to FIG. 4, a customer presents the document 160 to the document reader device 205 capable of translating the document 160 into a bitmap image, as shown in step 400. A decoder that is either part of the document reader device 205, or a separate device, will decode the machine readable code into the encrypted personal identification information, as shown in step 415. The controller module 215 will initiate a challenge-response protocol, resulting in the customer entering his password into the controller module 215, as shown in step 430. Next, the controller module 215 opens a challenge-response protocol with the merchant, resulting in the merchant entering his password into the controller module 215, as shown in step 445. The decryptor 235 in operative communication with the controller module 215 will partially decrypt the PII using the merchant's password, as shown in step 460. The password is typically a PIN, which references the merchant's private key. The partially decrypted PII is then fully decrypted using the customer's password, as shown in step 475, resulting in the PII being fully decrypted and available for viewing by the merchant and customer, as shown in step 490. The customer's password may also be in the form of a PIN, which references the customer's symmetric private key also known as the customer's secret key. In an embodiment, this key is encrypted with the customer's PIN. If the document 160 contains additional PII encrypted with a password other than the merchant's, the PII will not be decrypted and it will be inaccessible to the customer and that merchant. Also, if the merchant's key fails to decrypt the PII, none of the secure PII will be able to be viewed by the merchant or the customer.

FIG. 5 shows an example of a hardcopy document 160 containing secured personal identification information created using the disclosed system and method. The document 160 is in the form of a credit (or debit) card and includes both human readable text, shown generally at 510, and machine readable code, shown generally at 500, 520 and 540. The secured personal identification information (PII) belongs to John Q. Adams, which is shown as human readable text at 510. Document 160 includes various secured PII, such as, for example, a credit card account number, a bank account number, and a date of birth for John Q. Adams. The credit card account number 530 is only partially revealed in an unsecured form, but is incorporated in the document 160 using machine readable code configured as a glyph block shown at 500. The contents of the glyph block 500 have been encrypted using for example, John Q. Adams' password (private key) and a merchant's password (public key). In an embodiment, the glyph block 500 contains John Q. Adams' credit card account number in its entirety and is read by the system 200 to complete a credit card or debit card purchase transaction when both John Q. Adams and a merchant enters associated passwords or PINs. On the obverse side of the document 160, secured PII, for example, the bank account number, is encoded as a bar code 520, which has been encrypted, for example, with John Q. Adams private key and a bank teller's public key, such that decryption can only be carried out when both a bank teller having an associated private key and John Q. Adams private key are entered into system 200. The secured PII is decrypted at a bank using the bank's system 200 to obtain the secured PII that is required to complete a bank transaction. The obverse side of the document 160 also includes a magnetic stripe 540 upon which is encrypted further PII, such as, for example, the date of birth of John Q. Adams. The date of birth may be required for the purchase of certain products like tobacco and alcohol. In order to decrypt the secured PII (date of birth), the private key of the merchant and the private key of John Q. Adams is entered into the system 200.

A method for creating a document containing secured personal identification information includes accessing a database that contains personal identification information for at least one individual; choosing which personal identification information should be secured; encrypting the personal identification information using a public key associated with a merchant; encrypting the personal identification information using a private key associated with an individual to whom the personal identification information belongs; encoding the encrypted personal identification information into machine readable code; and incorporating the encoded personal identification information within a document to create a document containing secured personal identification information.

A method for accessing secured personal identification information contained in a document includes detecting secured personal identification information in a document; decoding the secured personal identification information in the document; entering a private key associated with a merchant wishing to gain access to the secured personal identification information in the document; entering a private key associated with an individual to whom the document belongs; determining which of the secured personal identification information contained in the document should be decrypted; and accessing the decrypted personal identification information such that the merchant is able to view the personal identification information.

Access to secured personal identification information within a document can be controlled such that multiple users can access the same or different personal identification information. For example, a document containing secured personal identification information including a drivers license number, a social security number, a bank account number and a credit card number would function with the system and method disclosed herein. The document may contain human readable passages, for example the name of the owner of the personal identification information and machine readable code, for example, the driver license number, social security number, bank account number and credit card number of the owner of the personal identification information.

An individual carrying a document having secure personal identification information disclosed herein is stopped by a policeman on the street for speeding. The policeman will need to access certain secured personal identification information within the document. The policeman may be equipped with a system disclosed herein for accessing the secured personal identification information. The policeman will identify himself by entering his password in a controller module, for example, a keyboard, that is in communication with the system for accessing secure personal identification information disclosed herein. The policeman has a password (private key) that allows access to the name, age, driver's license number and car registration for the individual he has stopped. The individual will identify himself by entering his password (private key) in the controller module. The system will then decode and decrypt the personal identification information that the policeman should have access to.

An individual carrying a document having secure personal identification information disclosed herein is attempting to buy liquor at the local liquor store. The merchant at the liquor store will need to access certain secured personal identification information within the document. The merchant may be equipped with a system disclosed herein for accessing the secured personal identification information. The merchant will identify himself by entering his password in a controller module, for example, a keyboard, that is in communication with the system for accessing secure personal identification information disclosed herein. The merchant has a password (private key) that allows access to the name and age of the individual attempting to purchase alcohol. The individual will identify himself by entering his password (private key) in the controller module. The system will then decode and decrypt the personal identification information that the merchant should have access to.

The systems and methods disclosed herein could be used for providing secured personal identification information which would not be readable, alterable, or forgeable by just any individual. The systems and methods have application for many types of documents, including, but not limited to, identification documents, government documents, travel documents, and tickets to events. For example, machine readable passports, visas and border crossing cards are more difficult to counterfeit or alter, allow faster but more thorough inspection of each carrier, and permit instantaneous capture of data from each document. The system and methods could be used to create travel documents and identification cards that would provide better security and reduce alterations, forgeries, and other illicit activities by avoiding reproduction or viewing of personal identification information, such as social security numbers, without proper authority and equipment. The authority to view personal identification information within an identification document can be restricted to parties requiring access to the personal identification information while maintaining the suitability of the document for its intended purposes.

Birth, marriage and death documents, which are often treated as public records, would be much more secure if they contained machine readable code. Therefore, the disclosed methods could be used to provide a sense of security to these otherwise public documents.

All patents, patent applications, and published references cited herein are hereby incorporated by reference in their entirety. It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A system for creating a document containing secured personal identification information comprising:

a memory storing a plurality of computer-executable modules;

a database for containing a plurality of entries of personal identification information associated with a person to whom the personal identification information belongs, the database further for associating each entry of the plurality of entries of personal identification information with a respective merchant within a plurality of merchants;

a classifier module processor communicatively coupled to the memory which, when executed by the processor, causes the processor to perform the steps of:
  receiving the plurality of personal identification information from the database;
  determining a first set of personal identification information belonging to the person and associated with a first merchant within the plurality of merchants; and
  determining a second set of personal identification information belonging to the person and associated with a second merchant within the plurality of merchants, the second merchant being different from the first merchant;

a password generator, communicatively coupled with the classifier module, for:
  receiving the first set of personal identification information and receiving the second set of personal identification information from the classifier module;
  determining a first password combination comprising a first public key associated with the first merchant and a private key associated with the person to whom the personal identification information belongs, the determining the first password combination further comprising determining the first public key and the private key;
  determining a second password combination comprising a second public key associated with the second merchant and the private key associated with the person to whom the personal identification information belongs, the determining the second password combination further comprising determining the second public key and the private key;
  associating the first password combination with the first set of personal identification information; and
  associating the second password combination with the second set of personal identification information;

an encryptor for:
  receiving the first set of personal identification information and the second set of personal identification information from the memory;
  encrypting into a first set of encrypted information, based upon the associating the first password combination with the first set of personal identification information, the first set of personal identification information using the first password combination; and
  encrypting into a second set of encrypted information, based upon the associating the second password combination with the second set of personal identification information, the second set of personal identification information using the second password combination;

an encoder for:
  receiving the first set of encrypted information and the second set of encrypted information, from the encryptor;
  converting the first set of encrypted information and the second set of encrypted information into machine readable code containing the first set of encrypted information and the second set of encrypted information;

applying decryption to the machine readable code based on the first password combination;

accessing the first set of personal identification information;

applying decryption to the machine readable code based on the second password combination; and accessing the second set of personal identification information; and a data recording system, communicatively coupled with the processor, for embedding, into a hardcopy document, the machine readable code containing the first set of encrypted information and the second set of encrypted information.

2. The system of claim 1 wherein the data recording system is further for reproducing a second hardcopy document that is a copy of the hardcopy document, the second hardcopy document also containing the first set of encrypted information and the second set of encrypted information.

3. The system of claim 1, wherein the plurality of personal identification information comprises a social security number.

4. The system of claim 1, wherein the plurality of personal identification information comprises a bank account number.

5. The system of claim 1, wherein the plurality of personal identification information comprises an image.

6. The system of claim 5 wherein the image comprises a picture of an individual to whom the personal identification information belongs as personal identification information associated with the hardcopy document.

7. The system of claim 1, wherein the plurality of personal identification information comprises personal identification information associated with the person and having different levels, the different levels comprising a first level and a second level, the first set of personal identification information having the first level, wherein the classifier module is further for determining a third set of personal identification information associated with the first merchant, belonging to the person and having the second level, and wherein the password generator is further for:

determining a third password combination comprising a third public key and a second private key, the determining the third password combination comprising determining the third public key that is associated with the first merchant and the second level, and further comprising determining the second private key that is associated with the second level; and associating the third password combination with the third set of personal identification information, wherein the encryptor further for encrypting into a third set of encrypted information, based upon the associating the third password combination with the third set of personal identification information, the third set of personal identification information using the third password combination, wherein the encoder is further for converting the first set of encrypted information, the second set of encrypted information and the third set of encrypted information into machine readable code containing the first set of encrypted information, the second set of encrypted information, and the third set of encrypted information, and wherein the data recording system is further for embedding, into the hardcopy document the machine readable code containing the first set of encrypted information, the second set of encrypted information, and the third set of encrypted information.

8. The system of claim 1 wherein the encoder is for providing the machine readable code as a glyph block.

9. The system of claim 1 wherein the encoder is for providing the machine readable code as encoding for a magnetic stripe.

10. The system of claim 1, wherein the password generator is further for associating a plurality of different password combinations with each set of personal identification information, and wherein the password generator is further for determining each of the plurality of different password combinations by determining a respective different public key that is different from a public key of each of the other plurality of different password combinations and is associated with a different merchant, wherein the respective different public key is for authorizing such merchant to access the respective collection of personal identification information from the hardcopy document.

11. The system of claim 10, wherein the password generator is further for determining each of the plurality of different password combinations comprising a different symmetric private key, the determining each of the plurality of different password combinations comprising determining the different symmetric private key that is different from a symmetric private key of each of the other plurality of different password combinations and is associated with the person to whom the collection of personal identification information belongs for authorizing access to such respective collection of personal identification information from the hardcopy document.

12. A system for creating a document containing secured personal identification information comprising:

a database containing a plurality of entries of personal identification information associated with a person to whom the personal identification information belongs, the database being further configured to associate each entry of the plurality of entries of personal identification information with a respective merchant within a plurality of merchants;

a classifier module processor configured to:

determine a first set of personal identification information belonging to the person and associated with a first merchant within the plurality of merchants; and determine a second set of personal identification information belonging to the person and associated with a second merchant within the plurality of merchants, the second merchant being different from the first merchant;

a password generator processor in operative communication with the processor, the password generator processor configured to:

determine a first password combination comprising a first public key associated with the first merchant and a private key associated with the person to whom the personal identification information belongs, a determination of the first password combination comprising determining the first public key and the private key;

determine a second password combination comprising a second public key associated with the second merchant and the private key associated with the person to whom the personal identification information belongs, a determination of the second password combination comprising determining the second public key and the private key;

associate the first password combination with the first set of personal identification information; and associate the second password combination with the second set of personal identification information;

an encrypting processor configured to:

encrypt into a first set of encrypted information, based upon the associating the first password combination with the first set of personal identification information, the first set of personal identification information using the first password combination; and encrypt into a second set of encrypted information, based upon the associating the second password combination with the second set of personal identification information, the second set of personal identification information using the second password combination;

an encoding processor configured to:

convert the first set of encrypted information and the second set of encrypted information into a machine readable code containing the first set of encrypted information and the second set of encrypted information without indication which part of the machine readable code comprises the first set of encrypted information and the second set of encrypted information;

apply decryption to the machine readable code based on the first password combination;

access the first set of personal identification information;

apply decryption to the machine readable code based on the second password combination; and access the second set of personal identification information; and a data recording system, communicatively coupled with the processor, configured to embed, into a hardcopy document, the machine readable code containing the first set of encrypted information and the second set of encrypted information.

13. A method for creating a document containing secured personal identification information, the method comprising:

associating, with a computer, a plurality of entries of personal identification information with a person to whom the personal identification information belongs;

associating, with the computer, each entry of the plurality of entries of the personal identification information with a respective merchant within a plurality of merchants;

determining, with the computer, a first set of personal identification information belonging to the person and associated with a first merchant within the plurality of merchants;

determining, with the computer, a second set of personal identification information belonging to the person and associated with a second merchant within the plurality of merchants, the second merchant being different from the first merchant;

determining, with the computer, a first password combination comprising a first public key associated with the first merchant and a private key associated with the person to whom the personal identification information belongs, the determining the first password combination further comprising determining the first public key and the private key;

determining, with the computer, a second password combination comprising a second public key associated with the second merchant and the private key associated with the person to whom the personal identification information belongs, the determining the second password combination further comprising determining the second public key and the private key;

associating, with the computer, the first password combination with the first set of personal identification information;

associating, with the computer, the second password combination with the second set of personal identification information;

encrypting, with the computer, into a first set of encrypted information, based upon the associating the first password combination with the first set of personal identification information, the first set of personal identification information using the first password combination; and encrypting, with the computer, into a second set of encrypted information, based upon the associating the second password combination with the second set of personal identification information, the second set of personal identification information using the second password combination;

converting, with the computer, the first set of encrypted information and the second set of encrypted information into a machine readable code containing the first set of encrypted information and the second set of encrypted information without indication which part of the machine readable code comprises the first set of encrypted information and the second set of encrypted information;

applying decryption to the machine readable code based on the first password combination;

accessing the first set of personal identification information;

applying decryption to the machine readable code based on the second password combination;

accessing the second set of personal identification information; and embedding, into a hardcopy document with a data recording system, the machine readable code containing the first set of encrypted information and the second set of encrypted information.

14. The system of claim 12, wherein the database processor is further for containing the plurality of personal identification information that comprises text and an image including a picture of an individual to whom the personal identification information belongs as personal identification information associated with the hardcopy document.

15. The system of claim 1, the first set of personal identification information defining a first part of a credit card number, and the data recording system further for embedding a second part of the credit card number into the hardcopy document in an unsecured form, the second part being different than the first part.

* * * * *